United States Patent
Friesen et al.

(10) Patent No.: US 12,359,925 B2
(45) Date of Patent: Jul. 15, 2025

(54) SYSTEM FOR GENERATING CRYPTOGRAPHIC MATERIAL

(71) Applicant: DAIMLER AG, Stuttgart (DE)

(72) Inventors: Viktor Friesen, Karlsruhe (DE); Viktor Pavlovic, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 462 days.

(21) Appl. No.: 17/595,991

(22) PCT Filed: May 8, 2020

(86) PCT No.: PCT/EP2020/062886
§ 371 (c)(1),
(2) Date: Dec. 1, 2021

(87) PCT Pub. No.: WO2020/244886
PCT Pub. Date: Dec. 10, 2020

(65) Prior Publication Data
US 2022/0307847 A1     Sep. 29, 2022

(30) Foreign Application Priority Data
Jun. 3, 2019   (DE) .................... 10 2019 003 904.1

(51) Int. Cl.
*G01C 21/34*  (2006.01)
*H04W 12/041* (2021.01)

(52) U.S. Cl.
CPC ...... *G01C 21/3438* (2013.01); *H04W 12/041* (2021.01)

(58) Field of Classification Search
CPC .... G01C 21/3438; H04W 12/041; G06F 8/35; H04L 2209/84; H04L 9/0877
See application file for complete search history.

(56) References Cited

U.S. PATENT DOCUMENTS

| | | | |
|---|---|---|---|
| 8,989,386 B2 | 3/2015 | Falk | |
| 2002/0029256 A1* | 3/2002 | Zintel | H04L 61/30 709/218 |
| 2006/0026522 A1* | 2/2006 | Bendsen | G06F 8/34 715/764 |
| 2009/0327998 A1* | 12/2009 | McCoy | G06F 8/38 717/113 |

(Continued)

FOREIGN PATENT DOCUMENTS

| | | |
|---|---|---|
| CN | 102986161 A | 3/2013 |
| CN | 104868998 A | 8/2015 |

(Continued)

OTHER PUBLICATIONS

Asia CCS '17: Proceedings of the 2017 ACM on Asia Conference on Computer and Communications SecurityApr. 2017pp. 835-848https://doi.org/10.1145/3052973.3052982 (Year: 2017).*

(Continued)

*Primary Examiner* — Sangseok Park
(74) *Attorney, Agent, or Firm* — PATENT PORTFOLIO BUILDERS PLLC (57) ABSTRACT

A system for generating cryptographic material includes a cryptomaterial server and developer module. The cryptomaterial server has at least one cryptomaterial generator and a cryptomaterial distributor. The cryptomaterial generator is set up to generate cryptographic material by using specifications that can be predetermined via the developer module. The cryptomaterial server has a receiving part of a specification interface and the developer module has a corresponding sending part of the specification interface, which can be coupled directly or indirectly for the secure transmission of data. The developer module has a user interface or can be coupled directly or indirectly to one that is set up for an input of the specifications in abstract form. A transformation module automatically transforms the input specifications into a syntax of the cryptomaterial generator.

17 Claims, 2 Drawing Sheets

(56) References Cited

U.S. PATENT DOCUMENTS

| | | | | |
|---|---|---|---|---|
| 2013/0246800 A1* | 9/2013 | Stewart | ............... | H04L 63/0428 |
| | | | | 713/176 |
| 2015/0309815 A1* | 10/2015 | Crowther | .............. | G06F 9/4552 |
| | | | | 717/148 |
| 2016/0048812 A1* | 2/2016 | Collins | ............ | H04N 21/47815 |
| | | | | 705/26.1 |
| 2018/0239910 A1* | 8/2018 | Isshiki | .................. | H04L 9/3231 |
| 2020/0372183 A1* | 11/2020 | Rangaiah | ................ | G06F 21/57 |

FOREIGN PATENT DOCUMENTS

| | | | |
|---|---|---|---|
| DE | 102015208899 A1 | | 3/2016 |
| DE | 102018120915 A1 | | 2/2019 |
| EP | 1890228 A2 | | 2/2008 |
| EP | 3261013 A1 | | 12/2017 |
| EP | 3474488 A1 | | 4/2019 |
| KR | 20050007901 A | * | 1/2005 |
| WO | 2015094326 A1 | | 6/2015 |
| WO | 2017220389 A1 | | 12/2017 |

OTHER PUBLICATIONS

International Search Report mailed Aug. 10, 2020 in related/corresponding International Application No. PCT/EP2020/062886.
Written Opinion mailed Aug. 10, 2020 in related/corresponding International Application No. PCT/EP2020/062886.
Office Action dated Nov. 28, 2023 in related/corresponding CN Application No. 202080043556.2.

* cited by examiner

SYSTEM FOR GENERATING CRYPTOGRAPHIC MATERIAL

BACKGROUND AND SUMMARY OF THE INVENTION

Exemplary embodiments of the invention relate to a system for generating cryptographic material having a cryptomaterial server and a developer module, as well as to a method for generating cryptographic material by means of such a system.

The use of cryptographic material is essential in many modern systems for achieving reliable and secure communication in which third parties cannot manipulatively intervene. Above all, modern vehicles are characterized by increasing networking. Here, the vehicles are not only connected to generally accessible systems such as the World Wide Web or the Internet, but also to dedicated systems provided by vehicle manufacturers and service providers, such as apps or servers, which are developed and operated by the manufacturer, for example, exclusively for their own vehicles or their own fleet. Service providers can also offer corresponding services, optionally in cooperation with the manufacturers. Examples could be access authorization/driving authorization in a car sharing system, a server-based navigation solution or similar.

A plurality of access accounts, interfaces, and applications, which all have to be secured by suitable cryptographic methods and the mechanisms, protocols and similar etc. lying behind them, emerge as a result of the varied communication relationships within such a vehicle ecosystem. Here, from the point of view of information technology security, the vehicle ecosystem forms a very specific and complicated environment. This is due to many reasons, such as e.g., limited hardware resources, lack of direct access to the vehicles for clients, extensively non-standardized heterogeneous systems, etc. These specifics lead to standardized cryptographic methods often not being able to be directly undertaken and, instead, individual specifically tailored solutions having to be developed. These specifically tailored cryptographic methods require a variety of cryptographic material that must be optimized for the respective application/interface in order to enable a maximum degree of security with minimal costs and the best possible degree of comfort. In the context of the present invention, cryptographic material or cryptomaterial is to be understood as data that can be used for cryptographic purposes. These can be, in particular, key pairs, symmetrical keys, certificates, randomized numbers, hash values, and similar. Here, it furthermore applies that diverse systems and applications are associated with one another in a variety of ways. This also correspondingly applies to the cryptographic material that must be installed on the respective systems before they can be put into operation. In this context, there is talk of so-called "provisioning". Furthermore, the vehicle ecosystem is subjected to permanent changes. Thus, already active systems, for example, are updated via a software update, or new systems, such as vehicles, app installations etc., are added or similar. Many of these changes require new cryptographic material. This means that new cryptographic material also has to be continually generated for established applications and systems. It is thus not sufficient if the systems have been supplied once with the cryptographic material necessary at this point in time before they are put into operation.

All this finally leads to the cryptographic material pre-installed on the respective systems being able to be very complex. Moreover, it is necessary to generate the cryptographic material on secure systems and to distribute it on secure communication paths. Thus, the correct, secure, and robust generation and distribution of the respectively suitable cryptographic material becomes a great time- and cost-intensive challenge.

Here, it is known from the general prior art that cryptographic material is generated and typically stored on a system having a cryptomaterial server. Here, a hardware security module, which is referred to as a Hardware Security Module (HSM) even in professional circles, can form the core of this cryptomaterial server. The products by Thales, for example the nShield Connect HSM, are a typical example of a commercial HSM. These offer interfaces for user programs. By using these interfaces, a program is then implemented in a higher level programming language (e.g., Java or C++), by means of which the secure generation of the cryptomaterial in the HSM and its storage and distribution on the cryptomaterial server is controlled. If cryptomaterial is to be generated for a new application, a new program is written for this application or an existing program is correspondingly expanded or changed.

As already described, the cryptomaterial for the distributed applications in a vehicle ecosystem can be very complex. It often includes various features of the participating systems, such as e.g., identities, versions, rights, etc. and diverse connections between them and usually builds on cryptomaterial that has already been generated. As a result of this complexity, the coordination of the cryptomaterial to be generated, its specification, subsequent implementation, and its testing quickly become extremely laborious.

In this context, in terms of the prior art in the field of private cryptographic keys, reference can be made to DE 10 2015 208 899 A1. According to the disclosure there, a private starting value and at least one context parameter are used when generating cryptographic material, here the private cryptographic key.

DE 10 2018 120 915 A1 discloses a system for generating cryptographic material having a cryptomaterial server and a developer module. The cryptomaterial server comprises a cryptomaterial generator and a cryptomaterial distributor.

A system for generating cryptographic material is described in EP 3 474 488 A1, which comprises a key-generating and distributing server and an interface for data transfer.

Exemplary embodiments of the present invention are directed to a system and a method for generating cryptographic material, in particular for vehicle applications, which significantly reduce the extreme effort described above.

Much like the systems in the prior art, the system according to the invention for generating cryptographic material comprises a cryptomaterial server and a developer module. For its part, the cryptomaterial server comprises the actual cryptomaterial generator and a cryptomaterial distributor, which forwards the generated cryptomaterial to the corresponding receivers and users. Here, they can optionally also be identical, yet this does not have to be the case. Examples of receivers would be, for example, email accounts or servers for installing the material on products. Examples of users would be, for example, the product itself, for example the control device of a vehicle, an application, in particular an app on a mobile terminal, or even a server that communicates with the corresponding product, in particular a vehicle. The cryptomaterial generator is here set up to generate the necessary cryptomaterial for the corresponding receivers/users. This generation or creation of the cryptomaterial is here carried out by means of specifications, which are predetermined according to the product and the use of the cryptographic material. The developer module serves this purpose. This construction is so far very similar to the prior art.

According to the invention, an automated process occurs at the location of a complex description of the usage situation for the cryptomaterial with a subsequent similarly complex programming of a special program in a high-level language, which is then installed on the cryptomaterial server and provides for the creation of the suitable cryptomaterial. For this, it is provided according to the invention that the cryptomaterial server has a receiving part of a specification interface, and the developer module has a corresponding transmitting part of the specification interface. These are designed and are to be directly or indirectly coupled to one another in such a way that a secure transfer of data can be carried out. The coupling can be carried out, for example, via a secure cable-free or cable-bound transfer path. It is also possible to transfer the specifications generated in the developer module, for example via a USB stick or similar, to the cryptomaterial server securely, such that the danger of corruption of the data transfer can be minimized.

The developer module itself now has a user interface or is to be coupled directly or indirectly to one. The user interface is set up for inputting the specifications in abstract form. The entire system further has a transformation module, which is formed for automatically transforming the input specifications into a syntax of the cryptomaterial generator. As a result of the transformation module, the system according to the invention thus enables an abstract formal "language" for unambiguously describing the necessary cryptographic material to be used. Such an abstract, formal, and "practicable" language can then be used to describe general and randomly complex specifications to cryptographic material. Such a language can be developed correspondingly simply. It is here complete, which means that all conceivable variants of the cryptomaterial can be defined, such as, for example, all common crypto methods, in particular those that are supported by the cryptomaterial generator or its subcomponents. All common coding methods can be used, for example before the signing or encrypting ASN.1/DER. Furthermore, common compression methods can be used, such that a compression can be carried out by ZIP before dispatching, for example.

The abstract form of such a language means that the use of this language for human users is simple and intuitive, both for compiling the specifications for the cryptographic material and for reading already compiled specifications. Formal further refers to a formal syntax of the language, such that each formulated specification has an unambiguous meaning both for the user and for the system. Thus, the input specification can be automatically understood and interpreted by the transformation module. The transformation module is then able to convert the input specification automatically into a syntax which the cryptomaterial generator understands and can use. Furthermore, such a language for the transformation is to be practicable, which means that a program corresponding to the specifications in the syntax of the cryptomaterial generator is generated from the abstract description of the necessary cryptomaterial, the program being able to be used directly on this in order to simply, securely, and reliably generate the necessary cryptographic material.

Thus, a considerable saving of time and thus, eventually, a cost reduction when generating the cryptomaterial emerge as a crucial advantage of the system according to the invention. Moreover, as a result of the automation, better repetition accuracy and thus, eventually, a higher degree of quality of the cryptographic material generated can be achieved. Moreover, by using a common set language for formulating and inputting the specification into the user interface, misunderstandings between individual developers who are responsible for different steps of the process in previous methods are precluded, such that a high degree of quality with minimal erroneous interpretations can be achieved using the system according to the invention. In case of doubt, the correctness of an exception can be verified more and more easily by using the formal language with its unambiguous setting.

Furthermore, the use of a formal language for the specifications allows for a kind of library, for example in the form of a database, to be compiled, in order to thus correspondingly simplify the compilation of new specifications because of the reuse of individual parts of previous specifications. Finally, such a library also not only increases the efficiency when compiling the necessary cryptographic material, but also its quality if only specification components that have already proved to be without error in the further course of their use are stored in the library.

Moreover, the use of a machine-readable language in the transformation module allows the process of setting and inputting the specifications to be able to be supported by machine. Thus, for example, an editor controlled by syntax can be used, which enables a syntax check and thus can, for example, graphically display incomplete specifications before these are transmitted to the transformation module.

Since, with this type of input and automatic transformation of the specifications into a program and the resulting omission of the programming task in comparison to the method from the prior art, numerous erroneous sources can be eliminated, testing the implementation of the cryptographic material generated is also greatly simplified or can ideally be completely omitted.

Thus, in all phases of the development, i.e., in the coordination of the specifications, in the implementation and in the test, considerable time and cost advantages emerge. In particular, the amount of time between the point in time at which it is established that cryptographic material is required and its provision can be reduced from several months, which has been usual up until now, to a few weeks or days.

An abstract formal language that can be implemented in the transformation module to describe the randomly complex cryptomaterial is connected to reasonable effort in terms of its development. Despite its complexity, the cryptographic material is, at its core, only a dataset that can be described statically. This means that the complete power of a higher level programming language, such as e.g., C++ or Java, or even what is known as Turing power—the programming language for describing cryptographic material— is not at all necessary. Much more primitive static means are completely sufficient for this. However, such an abstract static description can now be automatically transformed into practicable program code very easily and without problems. The automatic transformation thus does not constitute a fundamental obstacle.

Here, a very advantageous development of the system according to the invention provides that the transformation module is formed in the cryptomaterial generator. The transformation module can thus be, in particular, part of the actual cryptomaterial generator, such that only the specifications input in abstract form via the language also described in more detail are transmitted via the specification interface, and the whole transformation process is carried out inside the cryptomaterial generator. In terms of construction, this is very secure.

Furthermore, in the system according to the invention, an extremely favorable development provides that the cryptomaterial generator has a hardware security module for generating the cryptographic material. The cryptomaterial generator can thus, at its core, have a hardware security module. Such a hardware security module HSM has already been described at the start. A typical example of a commercial HSM can be, for example, the nShield Connect HSM by Thales. It can also be used in the system according to the invention. The laborious programming using the high-level language, for example Java or C++, is omitted here, since, based on the specification input in abstract form, the transformation module generates the corresponding instructions. According to an advantageous development of this idea of the invention, the syntax of the cryptomaterial generator is here predetermined by the syntax of the hardware security module.

Furthermore, the cryptomaterial server can have a cryptomaterial database in which cryptomaterial, which was generated by the cryptomaterial generator, can be stored or temporarily stored. The cryptomaterial distributor is then connected to the cryptomaterial generator directly or indirectly via the database. The cryptomaterial database itself can be connected directly, for example, to the hardware security module of the cryptomaterial generator and, in parallel to that, to the transformation module, i.e., by bypassing the hardware security module. A comparable connection is conceivable in relation to the cryptomaterial distributor. Thus, data can be relayed in various ways, either via the cryptomaterial database or bypassing it and either via the HSM—which is most secure variant in the end—or optionally also bypassing it.

The practicability of the abstractly formally input specifications can now be achieved substantially via two ways. The transformation module either comprises an interpreter for generating the syntax of the cryptomaterial generator. This correspondingly converts the specifications input abstractly formally via the user interface into the syntax of the cryptomaterial generator, and here in particular of its hardware security module. An implemented crypto library in the HSM offers all cryptographic primitives that are necessary for describing the cryptomaterial. These primitives can then be used to improve the readability, directly in the abstract language for the specifications, optionally after an adjustment of their labels, and are then allocated by the interpreter directly to the primitives of the Hardware Security Module.

With the interpreter-based approach, a common interpreter for all applications of the higher-level programming language is thus implemented. This interpreter combines the logic of all conceivable applications. This means that it can convert all conceivable valid specifications, for example with the aid of the HSM, into the corresponding cryptomaterial or can correspondingly instruct the HSM to generate this cryptomaterial. Finally, this means that the specifications in the abstract language described above can be implemented by the interpreter directly, i.e., without interposed translation and installation of a program on the cryptomaterial servers.

The alternative approach provides that the transformation module comprises a translator for generating a program code, which is set up to generate the syntax of the cryptomaterial generator. With such a translator-based approach, the translator finally generates the source code for a program in a higher level programming language, for example in Java, from the abstract specifications. This is then installed on the cryptomaterial server and is then used for the generation of the cryptographic material with the cryptomaterial generator or also here in particular again with its HSM, if this is present.

A further very favorable design of the invention provides that the user interface comprises a text-orientated or graphic-orientated syntax-controlled editor in the developer module for inputting the specifications in abstract form. Thus, a comfortable functioning when inputting the specifications, on one hand, and the interception of possible input errors, on the other hand, can be achieved via a suitable text and/or graphic orientated editor. According to a very advantageous development, the user interface can comprise checking modules for checking syntax and/or type checking the inputs of the specification for this purpose, regardless of how these have been input, yet in particular in combination with the text-orientated and/or graphic-orientated syntax-controlled editor just described.

A highly favorable development further provides that the user interface or the specification interface at least indirectly connected to it is set up to process the input of the specifications in a declarative, non-operational form. Such an input in a declarative form is completely sufficient for the specifications in relation to the cryptographic material to be generated and ultimately allows a very simple and efficient input and the simple and reliable conversion of the input specifications in the transformation module into the syntax of the cryptomaterial generator.

Furthermore, according to a very advantageous development of the system according to the invention, the cryptomaterial server can comprise a distributing interface via which a direct or indirect connection of at least one, yet typically several, receivers and/or users of the cryptographic material is implemented. The cryptomaterial distributor thus distributes the corresponding information to receivers, which are simultaneously users, or which further distribute the material, for its part, to users, in order to thus control the controls also via the distribution of the generated cryptographic material consistently in the region of the cryptomaterial server.

The method according to the invention now serves to generate cryptographic material by means of such a system according to the invention according to one or more of the designs described, wherein the cryptographic material is generated for vehicle-specific information technology systems. In addition, in the method according to the invention, the developer module is used in order to predetermine specifications suitable for the specific use, according to which the cryptographic material is generated by means of the predetermined specifications for each individual specific application in the system according to the invention and is distributed by this to the receiver and/or user of the specific application. The method for using the system according to the invention can thus ideally use this, in particular, in order to provide vehicle-specific, information technology systems with cryptographic material, i.e., to correspondingly optimize the complex processes portrayed above in the field of communication security in a vehicle ecosystem.

Further advantageous designs of the system according to the invention and the method also emerge from the exemplary embodiments, which are described in more detail below with reference to the figures.

BRIEF DESCRIPTION OF THE DRAWING FIGURES

Here are shown.

DETAILED DESCRIPTION

Figure 1:
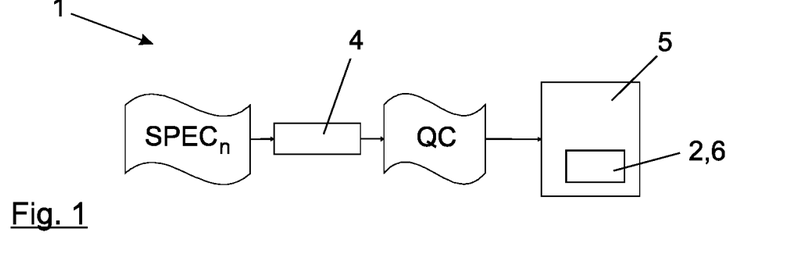
FIG. 1 a schematic depiction of a translator-based approach of a transformation module.

The system according to the invention proposes a transformation module 1 as an essential component, which is designed and used to provide an abstract, formal, and practicable language for unambiguous description of the specifications of cryptographic material. The transformation into the syntax of a cryptomaterial generator 2 depicted and described later in more detail can here be substantially achieved in two different ways. One way is indicated in the depiction of FIG. 1 and relies on a translator 4. Specifications SPEC are input via a user interface 3 not depicted in FIGS. 1 and 2, namely for a specific application n for which cryptographic material is to be generated. The specifications SPEC then reach the translator 4 and are converted by this into source code QC for the respective application n. This source code $QC_n$ is then installed as a program in a corresponding high-level language, in which the translator 4 has generated the source code QC, for example in Java, on a cryptomaterial server 5. Here, part of this cryptomaterial server 5 is the cryptomaterial generator 2 and, in particular, a hardware security module 6 not necessarily yet extensively present in the cryptomaterial generator 2, the hardware security module also being referred to as HSM.

Figure 2:
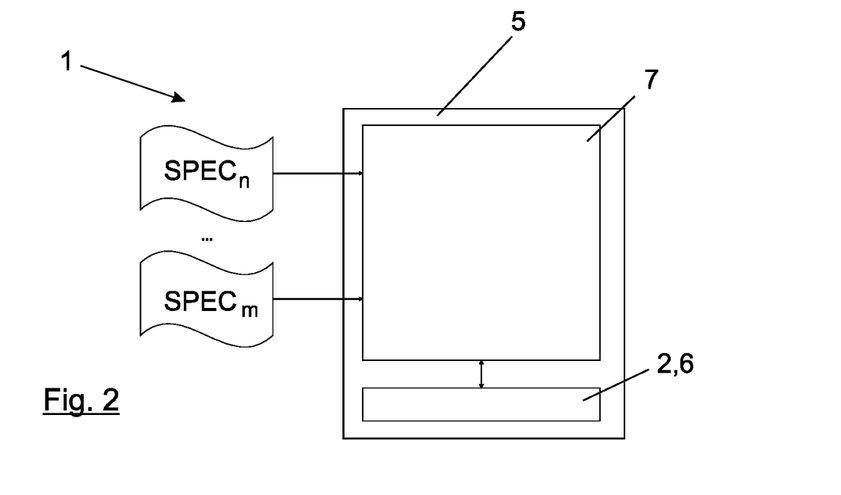
FIG. 2 a schematic depiction of an interpreter-based approach of a transformation module.

An interpreter-based approach of the transformation module 1 constitutes an alternative to this approach with the translator 4. FIG. 2 depicts such an approach by way of example. Here, various specifications $SPEC_n$ to $SPEC_m$ for different applications n, m are supplied directly to an interpreter 7, which uses a higher-level programming language as a common interpreter 7 for the specifications $SPEC_n$ to $SPEC_m$ of all applications n, m. The interpreter 7 unites the logic of all conceivable programming and can thus generate the desired cryptographic material for each conceivable valid specification SPEC, in particular by means of the HSM 6 via the cryptomaterial generator 2, which comprises this HSM 6. This means, in particular, that the specifications can be implemented by the interpreter 7 directly, so without interposed translation and, in particular, without interposed installation of the source code QC.

Figure 3:
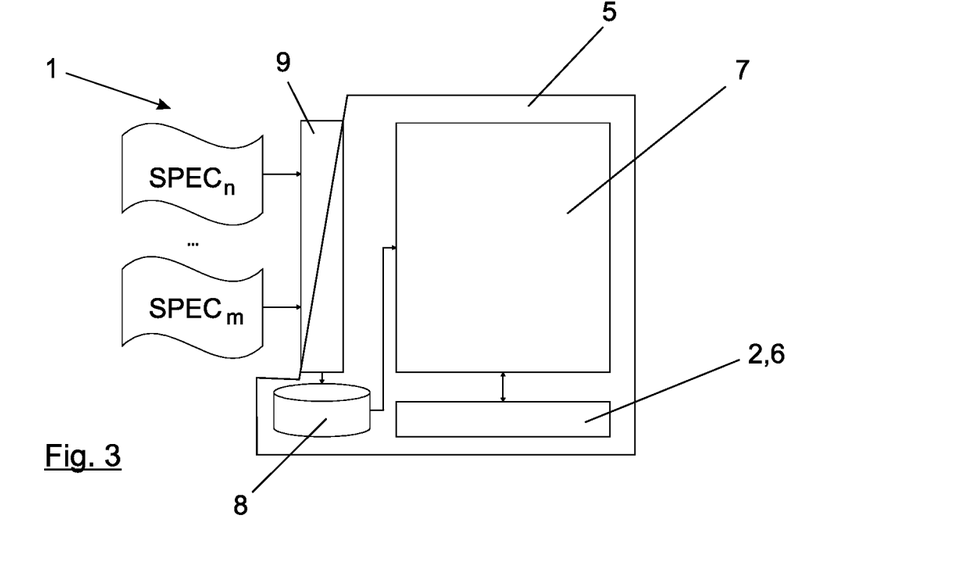
FIG. 3 an alternative interpreter based approach, in which the input and the use of the specifications by the interpreter are separated from one another.

Since an individual specification must be compiled for each of the applications n, m and in order to prevent these having to be input anew every time, the individual specifications can be filed in a specification database 8 and reloaded and implemented by the interpreter 7 as needed. This is correspondingly indicated in the depiction of FIG. 3. A specification interface 9 connects the individual specifications $SPEC_n$ to $SPEC_m$ to this specification database 8, which is then in turn connected to the interpreter 7 and, via this, to the cryptomaterial generator 2 or its HSM 6.

Figure 4:
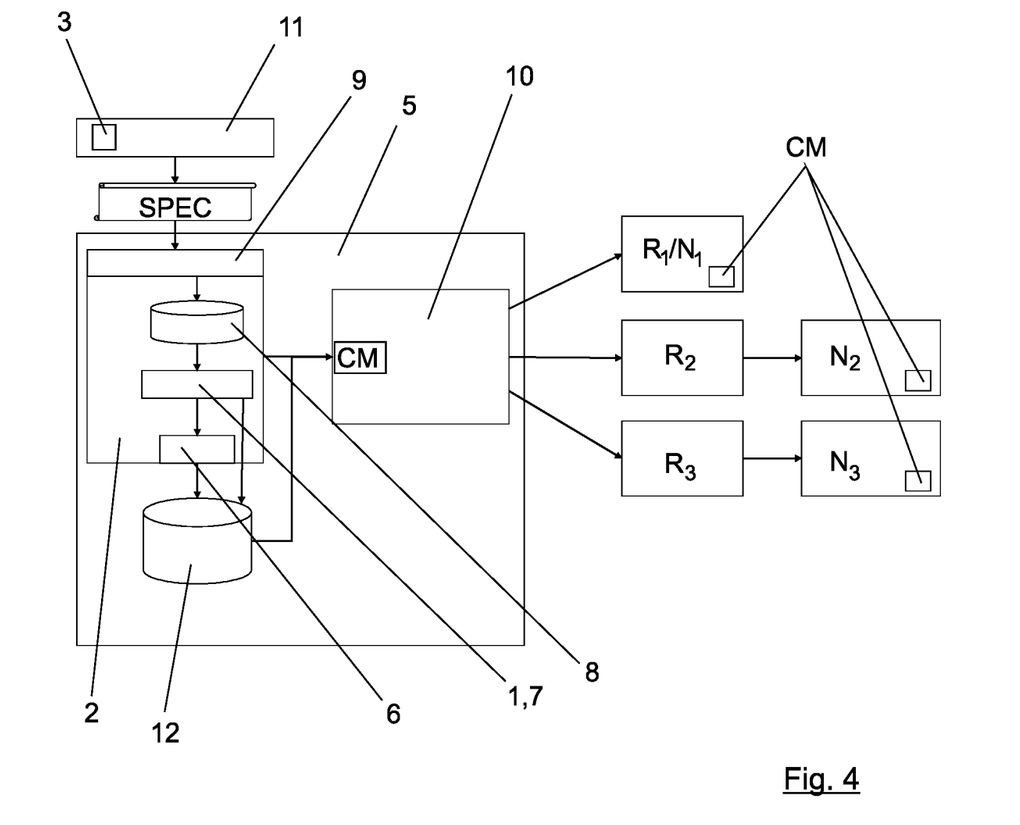
FIG. 4 an overview of a whole system having the system according to the invention for generating and distributing cryptographic material.

In the depiction of FIG. 4, a whole system is now shown. This serves to generate cryptographic material or cryptomaterial CM, which is preferably to be used in a vehicle ecosystem. The cryptomaterial server 5 used here comprises the cryptomaterial generator 2 in an inherently known manner in an exemplary embodiment characteristic of the system present here, the embodiment being depicted by way of example on the basis of an interpreter 7 as an essential component of the transformation module 1. The inherently known part of the cryptomaterial server 5 comprises, along with the cryptomaterial generator 2 that is also fundamentally known, though not in this embodiment, a cryptomaterial distributor 10, via which the cryptomaterial CM is distributed to various receivers $R_1$, $R_2$, $R_3$. Here, for example when the whole system is seen from the perspective of a vehicle manufacturer, the receivers can be the email account of a supplier, the server of a supplier, which then further distributes the cryptomaterial CM, or even the server of the manufacturer, for example at the end of the manufacturing process or the belt end of the vehicle manufacturing. The cryptomaterial is then forwarded to users, which are here assigned numerals $N_1$, $N_2$, $N_3$, by the receivers $R_1$, $R_2$, $R_3$, and the receivers $R_2$, $R_3$ are separated from one another, when the data are forwarded to a vehicle as user $N_2$, for example via a server as receiver $R_2$, such that eventually the cryptographic material CM is available to the user $N_2$, i.e., for example in the control unit of a vehicle. Of course, it is also conceivable that receiver $R_1$ and user $N_1$ are one and the same unit, for example a server, which communicates with the vehicle. Further examples for users N are, for example, applications on mobile terminals, which achieve a driving authorization, an access authorization for the vehicle or other communications to be encoded for security reasons.

The cryptomaterial CM is thus correspondingly generated on the cryptomaterial server 5 and further distributed by the cryptomaterial distributor 10. To generate the cryptomaterial CM suitable for the respective application n, m, a developer module 11 is now provided. This developer module 11 comprises, for example, a suitable editor, in order to input the corresponding specifications SPEC for the cryptographic material CM of the respective application n, m in a text-based and/or graphic-based manner. As already mentioned above, for this, a syntax check and similar can already be carried out in the editor itself. The input language or the graphical input is here abstractly formal and thus unambiguously understandable, both for various human users of the developer module 11 or its user interface 3 and for the system. Substantially analogously to the depiction in the design according to FIG. 3, the specifications are transmitted via an interface 9 in the cryptomaterial generator 2. Here, the specification database 8 can preferably be present, in order to use the advantages already described in the context of FIG. 3. Then the transformation module 1 follows, which is here formed as interpreter-based, yet fundamentally could be implemented just as well as a translator-based transformation module 1. The cryptomaterial generator 2 in the depiction according to FIG. 4 shall, in any case, comprise an HSM 6. Now it is possible to provide corresponding cryptomaterial CM on the one hand by the transformation module 1 or interpreter 7 and, on the other hand, by the HSM 6. This is then stored in an optional cryptomaterial database 12 and forwarded from here and, optionally, without intermediary storage, as is indicated in the depiction of FIG. 4, for distribution to the cryptomaterial distributor 10. From this, the distribution of the cryptomaterial described above to the receivers $R_1$, $R_2$, $R_3$ or users $N_1$, $N_2$, $N_3$ is then carried out. The specification database 8 here offers the advantage that, with increasing use of the cryptomaterial generator 2, this database is filled again and again, corresponding to the specification SPEC, if this is already known to it, to obtain the corresponding specifications SPEC for the corresponding task directly from the specification database 8 and, from this, to completely automatically generate the necessary cryptomaterial CM, in order to thus be able to save the input of repeating processes via the developer module 11.

Here, the considerations explained below underlie the development of a formal abstract language for use in the transformation module 11.

As an input parameter for a method for generating the suitable cryptomaterial CM, names or identifiers of the combinations of receivers $R_1$, $R_2$, $R_3$ and user $N_1$, $N_2$, $N_3$, which require the cryptomaterial CM, are used. Moreover, abstract specifications SPEC for the respective combinations are necessary, which require the cryptomaterial required by this, i.e., for example symmetrical or asymmetrical keys, certificates, random numbers, hash values and similar.

The output parameters for the transformation module 1 then substantially consist of a list of cryptomaterial datasets with a dataset for each system identifier, which corresponds to the specification of the cryptographic material CM according to the input parameters. In order to correspondingly convert these, the following steps are necessary: firstly, the necessary base types must be correspondingly identified, for example, the definition of the system identifier, such as a device ID, for example, a chassis number or similar in the form of a STRING can be carried out. Furthermore, version types can be defined, for example also in a STRING. Further necessary base data are also conceivable.

Subsequently, the type of the necessary structure must then be identified, for example an ARRAY or RECORD, in order to achieve as compact a description of the structures as possible, for example a list of the chassis numbers of a fleet in a field (ARRAY) or the systems of a vehicle as hierarchy of system and subsystems in a RECORD. Then, all of the cryptographic functions supported by the hardware security module 6 must be identified, for example hash methods, MAC methods, symmetrical encryption and decryption methods, asymmetrical methods (RSA, ECC etc.), X-509 certificates, together with all supported parameters and variants. For this, corresponding forms of spelling and preferably meaningful and easily understandable names are to be defined. Furthermore, all data types and formats required by the identified cryptofunctions must be identified and set for the input and output. For this too, appropriate meaningful names, such as OctetString, for example, should be chosen. Then, an extension of the cryptofunctions of base types must be defined on structured types. A speech construct can now be correspondingly defined for the composition and the encoding of the cryptomaterial CM to be output.

It is now crucial to establish a grammar that allows the description of the cryptomaterial CM by means of the identified base types, structured types and cryptofunctions and the dataset to be output. Here, this grammar describes a declarative language that can be easily interpreted, since the cryptomaterial can be described statically and thus declaratively. In particular, a non-operation language is necessary, such that the grammar remains correspondingly simple. Here, FOR loops, for example for initializing and processing ARRAYs, are sufficient. In particular, WHILE loops that are otherwise common in programming are not necessary. This has the crucial advantage that the programs run through to the end more and more reliably, regardless of possible parameters, which cannot guarantee such a consistent run-through of the program when querying a WHILE loop. Furthermore, no recursions are necessary. No dynamic data structures are also required. User-defined functions, procedures and methods are also not necessary, since the predefined functions here suffice for using the cryptofunctions.

The interpreter can now use this grammar in order to translate a specification SPEC corresponding to the grammar into a series of commands of a higher-level programming language such as Java or even C++, for example, which is then in turn used by the HSM 6. Because the target language itself is a Turing power programming language and because the cryptofunctions supported by the HSM are used exclusively in the specification language, the target language is complete. It thus covers all conceivable specifications. The language to be developed is here correspondingly simple since, due to the limitation described above such as its declarative, non-operational character, a correspondingly simple development is depicted and thus enables a simple interpreter 7 as an example of the transformation module 1.

The abstract language to be defined is respectively closely linked to the power of the HSM 6 installed in the underlying cryptomaterial generator 2, since the HSM 6 eventually defines the syntax for the cryptomaterial generator 2 and, above all, also forms the anchor for the security of the generated cryptomaterial CM. In order to achieve a high degree of security, all the generated cryptomaterial CM should be generated inside the HSM 6. Mechanisms that the HSM 6 does not support are nevertheless conceivable and indicated in FIG. 4. However, they should never be used in a maximum secure system with the specification SPEC.

The attachment of the abstractly formal language to the syntax of the HSM 6, however, now optionally results in a slightly deviating language generally having to be generated for each HSM 6. In order to avoid this effort, two solution approaches are substantially offered.

Thus, the language can be constructed modularly in a first approach. Here, further language elements can be added, depending on the HSM 6 used, to an obligatory core, which each relevant HSM 6 should support. The interpreter 7 is inherently "maximally powerful" and supports "all" HSMs, so does not have to be changed from system to system. Yet the number of accepted specifications would vary from HSM 6 to HSM 6.

The second solution approach provides that the language is the same for all systems, regardless of the HSM 6 used. All functions/mechanisms that are necessary or could be necessary for the creation of the cryptographic material CM are implemented in the software completely by the interpreter 7. Thus, the interpreter 7 could also manage completely without the HSM 6, which, however, would be rather precarious in terms of security in at least a few cases.

Here, it is the case that an input language is predetermined for the specifications SPEC in the user interface 3 or in the developer module 11 by the transformation module 1, the input language in any case not being the same as the language that is used as syntax of the cryptomaterial generator 2 or the HSM 6.

The interpreter 7 knows the HSM 6 underlying the respective system or cryptomaterial server 5 or cryptomaterial generator 2 and the functional scope supported by it. All functionalities supported by the respective HSM 6 are then also treated by this. This means that, instead of the individual software function classified as insecure, the interpreter 7, when at all possible, involves the functions of the HSM to be classified as secure. Only if specifications SPEC that the HSM 6 does not support have been used in the input are the available software functions of the interpreter 7 invoked or used.

This means that different cryptographic material CM would be generated/stored/sent with different levels of security. The user of the cryptomaterial server 5 can thus bypass it in a different manner. Thus, the user can only see how securely the respective cryptomaterial CM was generated/stored/sent. Here, different grades of security are conceivable, wherein the security or the degree of security can respectively be based on different aspects (generating, storing, sending). A very secure possibility for the user would be e.g., to set the cryptomaterial server 5 in such a way that this only generates secure cryptomaterial CM. If the input contains specifications SPEC which the cryptomaterial server 6 cannot securely implement, it refuses to generate the cryptomaterial CM.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A system for generating cryptographic material, the system comprising:
    a developer module, wherein the developer module has a user interface or is coupled directly or indirectly to the user interface, wherein the user interface is configured to accept an input of specifications, in abstract form, for generating a program in a syntax of a cryptomaterial generator or to translate the input specifications into a series of commands of a higher-level programming language executable by the cryptomaterial generator;
    a transformation module configured to automatically transform the input specifications into the program in the syntax of the cryptomaterial generator or into the series of commands of the higher-level programming language; and
    a cryptomaterial server comprising
        the cryptomaterial generator, which is configured to generate cryptographic material based on the inputted specifications by executing the program or by executing the series of commands in the higher-level programming language; and
        a cryptomaterial distributor,
    wherein the cryptomaterial server and the developer module has a corresponding sending part of the specification interface, wherein the receiving and sending parts of the specification interface are couplable directly or indirectly for the secure transmission of data.

2. The system of claim 1, wherein the transformation module is part of the cryptomaterial generator.

3. The system of claim 1, wherein the cryptomaterial generator has a hardware security module configured to generate the cryptographic material.

4. The system of claim 3, wherein the syntax of the cryptomaterial generator is predetermined by a syntax of the hardware security module.

5. The system of claim 1, wherein the cryptomaterial server further comprises a cryptomaterial database storing the cryptographic material generated by the cryptomaterial generator.

6. The system of claim 5, wherein the cryptomaterial distributor is connected to the cryptomaterial generator directly or indirectly via the cryptomaterial database.

7. The system of claim 6, wherein the cryptomaterial database is directly connected to a hardware security module of the cryptomaterial generator and in parallel to the transformation module in the cryptomaterial generator.

8. The system of claim 1, wherein the cryptomaterial generator further comprises a specification database.

9. The system of claim 1, wherein the transformation module comprises an interpreter configured to generate the series of commands of the higher-level programming language.

10. The system of claim 1, wherein the transformation module comprises a translator configured to generate the program in the syntax of the cryptomaterial generator.

11. The system of claim 1, wherein the user interface comprises a text-oriented or graphic-oriented syntax-controlled editor configured to input the specifications in the abstract form.

12. The system of claim 1, wherein the user interface comprises checking modules configured to check the syntax of the cryptomaterial generator or to check a type of the input of the specifications.

13. The system of claim 1, wherein the user interface is configured to process the input of the specifications in a declarative, non-operational form.

14. The system of claim 1, wherein the cryptomaterial server further comprises a distributing interface, wherein the cryptomaterial distributor is connected directly or indirectly to at least one receiver or user of the cryptographic material via the distributing interface.

15. A method, comprising:
    predetermining, by a developer module, specifications for a specific application of a vehicle-specific information technology system, wherein the specifications are predetermined via a user interface that accepts an input of the specifications in abstract form;
    receiving, by the cryptomaterial server from the developer module, the specifications;
    automatically transforming, by a transformation module, the specifications into program in a syntax used by a cryptomaterial generator or into a series of commands of a higher-level programming language executable by the cryptomaterial generator;
    receiving, by a cryptomaterial server from the transformation module, the program based on the specifications; and
    generating the cryptomaterial, wherein the cryptomaterial is generated, by the cryptomaterial generator executing the program based on the specifications or by executing the series of commands in the higher-level programming language; and
    distributing the generated cryptographic material to a receiver or user of the specific application.

16. The method of claim 15, wherein cryptomaterial generator includes a hardware security module that generates the cryptomaterial, wherein the syntax used by the cryptomaterial generator is predetermined by a syntax used by the hardware security module.

17. The method of claim 15, wherein the user interface comprises a text-oriented or graphic-oriented syntax-controlled editor via which the specifications are input in the abstract form.

* * * * *